United States Patent

[11] 3,603,935

[72] Inventor Ralph C. Moore
Manhattan Beach, Calif.

[21] Appl. No. 823,896
[22] Filed May 12, 1969
[45] Patented Sept. 7, 1971
[73] Assignee Xerox Corporation
Stamford, Conn.

[54] MEMORY PORT PRIORITY ACCESS SYSTEM WITH INHIBITION OF LOW PRIORITY LOCK-OUT
2 Claims, 4 Drawing Figs.

[52] U.S. Cl. .......... 340/172.5
[51] Int. Cl. .......... G06f 9/18
[50] Field of Search .......... 340/172.5; 235/157

[56] References Cited

UNITED STATES PATENTS

| | | | |
|---|---|---|---|
| 3,413,613 | 11/1968 | Bahrs et al. .......... | 340/172.5 |
| 3,200,380 | 8/1965 | MacDonald et al. .......... | 340/172.5 |
| 3,239,819 | 3/1966 | Masters .......... | 340/172.5 |
| 3,331,055 | 7/1967 | Betz et al. .......... | 340/172.5 |
| 3,333,252 | 7/1967 | Shimabukuro .......... | 340/172.5 |
| 3,399,384 | 8/1968 | Crockett et al. .......... | 340/172.5 |
| 3,482,264 | 12/1969 | Cohen et al. .......... | 340/172.5 |
| 3,482,265 | 12/1969 | Cohen et al. .......... | 340/172.5 |
| 3,483,522 | 12/1969 | Figueroa et al. .......... | 340/172.5 |

*Primary Examiner*—Raulfe B. Zache
*Assistant Examiner*—Sydney Chirlin
*Attorney*—Smyth, Roston & Pavitt

ABSTRACT: A control system for handling overlapping requests for communication between a plurality of processors and a memory or a memory bank is disclosed causing requests, after acceptance, to be serviced on a predetermined priority basis but preventing acceptance of new requests until all requests pending at the respective previous acceptance phase have been honored.

INVENTOR:
Ralph C. Moore

By Smyth, Roston & Pavitt
ATTORNEYS

INVENTOR:
Ralph C. Moore

ATTORNEYS

MEMORY PORT PRIORITY ACCESS SYSTEM WITH INHIBITION OF LOW PRIORITY LOCK-OUT

The present invention relates to a port system for digital data memories. Random access memories in modern data processing systems must satisfy multiuse requirements on a time-sharing basis. The same memory is required to furnish or to receive data respectively to and from different processors. Particularly large scale data-processing systems, such as digital computers, are not limited any more to one central processing unit for handling all arithmetic, control and data transfer operations involving data in and for memory. Instead, separate processing units are provided, for example, to handle the data transfer between memory and input-output devices, such as card readers, tape units, disc files, interrupt channels, etc., so that such transfer is operated and controlled independently from the processing circuits handling the principal program execution such as arithmetic operations at highest possible speeds.

At times the memory receives different requests from different processors concurrently or approximately concurrently for a data transfer operation between memory and the different processors. It is, therefore, necessary to organize the data traffic to and from memory, as during each memory cycle involving a memory read and write operation the memory can communicate with but one processor only, if the memory has but one access control unit. It is known to divide a memory into different banks with separate access controls for each bank so that two processors can communicate independently from each other with two different banks. Concurrent overlapping request for communication with the same memory bank will be less frequent in such a system but overlapping of requests with the same memory bank cannot be eliminated completely so that the principal problem of handling concurrent or overlapping communication requests of different processors with the same memory bank still remains.

The different processor connect to a memory or a memory bank through individual memory ports. The memory port control system has as its task to organize the traffic to and from the memory or memory bank through the several ports and to solve the problems of concurring requests. In a known system, the problem has been dealt with in such a manner that the ports are controlled and assigned along a particular priority rank, so that requests for memory communication made by a processor connected to a higher priority port are honored before the memory honors a request made by a processor through a lower priority port.

However, in view of the high speed involved in many of these processors it has been observed that a processor connected to a high priority port can, in effect, monopolize a bank so that a processor connected to a lower priority port has too rarely an opportunity to find its request honored. This problem has been dealt with in the following manner. The high speed central processing unit which, on the average, makes the most memory access requests for communication is connected to the lowest priority port, and the input-output devices of the peripheral equipment operating slowly and making memory access requests for communication less frequently connect to the higher priority ports. This is a satisfactory solution as long as peripheral equipment processors are only few in number. However, if there are many input-output devices, the total number of higher priority requests is such that they may monopolize a bank to the detriment of the CPU.

On the other hand, it has been suggested to dispense with the priority ranking of the several ports and to cycle communication through them, which means that if there are N ports for N different processors, each processor can communicate with the memory bank only every *n*th memory cycle. This prevents monopolization of the memory bank by one processor, but is unsatisfactory for high speed-high priority devices as they would have too rarely an opportunity to communicate with the bank.

The memory port system, and particularly the control system for handling memory access requests, in accordance with the present invention, satisfies high priority requirements without incurring the danger that a high speed-high priority processor monopolizes the memory bank. The principle underlying the invention is that the memory ports are cycles through memory request acceptance cycles or phases of variable length, depending upon the number of requests pending at particular instants, and the requests are honored at a predetermined priority, whereby a second request through a port will not be honored during the same cycle.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

Figure 1:
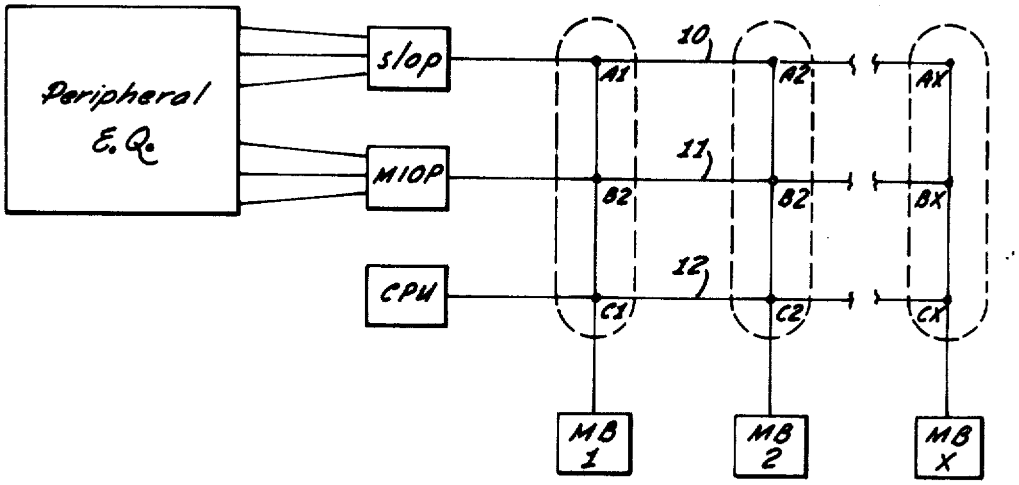
FIG. 1 illustrates schematically the layout of a processor, memory and connecting system for a digital system.

Proceeding now to the detailed description of the drawings, in FIG. 1 thereof, there is illustrated somewhat schematically the particular environment in which the inventive system finds utility. Essentially the figure illustrates schematically the basic building blocks for a general purpose, stored program digital computing system with emphasis on certain connecting features. The computer includes a central processing unit CPU performing all arithmetic and control functions in response to sequentially received instruction signals constituting a program.

The data are stored for immediate access by the CPU in a memory of the random access type. The memory is subdivided into a plurality of memory banks, designed MB1, MB2, etc., through MBX. The CPU, however, is not the only unit which seeks data communication with the memory. The computer system includes plurality of input-output devices, also called peripheral equipment, provided as memory extension devices and as communication link between the computer system and the human and/or equipment type users of the system. Therefore, the input-output equipment includes items such as typewriters, card readers, line printers, card or paper punches, display devices, etc. It can also include sensors, measuring instruments, etc. In addition, the peripheral equipment includes memory extension devices, such as rapid access discs, disc and/or tape files such magnetic tape and/or punched paper tape.

The communication between the computer proper and the peripheral equipment is handled through input-output processors, and the system representatively illustrated in FIG. 1 includes two of them, one being so-called selector input-output processor, SIOP, which handles data transfer between high speed peripheral equipment and memory. The normal and slow speed peripheral equipment communicates with the computer through a multiplexing input-output processor MIOP on a time-sharing basis.

It appears, therefore, that the several processors, such as CPU, MIOP and SIOP, communicate separately and independently with memory, particularly with the several memory banks MB1 through MBX. This communication involves particularly asynchronous data transfer in either direction, i.e., there is no fixed time relationship between, for example, the transfer of a particular peripheral equipment device or one of the input-output processors and memory, on one hand, and a transfer of data between CPU and memory on the other hand. It is for this reason that the memory has been subdivided into several banks so that several of these communications can occur simultaneously.

Nevertheless, it is, of course, necessary that all processors can communicate with all memory banks, because, for example, data are fed from a peripheral device into memory usually for the purpose of subsequent processing by the CPU, and external evaluation of data having been processed by the CPU and stored in memory, requires subsequent transfer from memory to peripheral equipment. Therefore, the division of the memory in the several banks merely permits concurrent memory transfer operation of the processors to some extent only, and conflicts, i.e., overlapping access requests for communication in the same bank are to be expected. The probability of conflicts is reduced the more the memory is being divided into individually and concurrently accessible banks, but, of course, there is a practical and economic limit to such division, as a separate port and a separate access system is needed for each bank.

As schematically indicated in FIG. 1, there is a communication bus system which handles data and control signal transfer between all processors and all memory banks. The details of the bus system do not require consideration. Reference is made here to the application of common assignee, Ser. No. 678,235, filed Oct. 26, 1967. Each of the processors has an input-output cable for purposes of this communication. The cables are 10, 11 and 12, respectively, for CPU, MIOP and SIOP. Each of these cables are connected to each of the memory banks MB1 through MBX. As schematically indicated, there is a memory port system for each bank for the purpose of this connection. For example, port system P1 connects cables 10, 11 and 12 to memory banks MB1. Port system P2 connects cables 10, 11 and 12 to memory bank MB2, etc.

For each connection within a port system there is provided a particular port and these ports are designated with A, B and C for respective tapping cables 10, 11 and 12. In other words, the port A1 of port system P1 connects cable 10 to memory bank MB1. The port at B1 connects cable 11 to memory bank MB1. Ports A2, B2, C2 provide similar connections in the memory bank MB2, etc. It is a principal function of each port system, as associated with a particular memory bank, to handle and organize the traffic of data as between that bank and any of the processors seeking data communication with the bank. Each bank can communicate with only one processor at a time. The memory bank is, so to speak, the passive element of this communication, as only the processors can make requests seeking communication. Therefore, it is the function of the port system to organize and sort the asynchronous and possibly overlapping requests as made by the several processors.

Many details of the memory port system are described in the above-identified application. However, the port system, as described in that application, has a fixed priority sequence with regard to processing of requests made concurrently by the several processors for communication with a particular memory bank. As stated above, such a system works satisfactorily if the processor connected to the port with the lowest priority is the one which issues most frequently requests for communication with the bank and the total number of memory requests made through the higher priority ports per unit time, is still considerably smaller than the frequency of requests made by the CPU. However, if the number of peripheral devices is very large, together they may monopolize that bank. As was mentioned above, the principal object of the invention is to obviate such monopolization. The circuit shown in FIG. 2 is designed particularly to control the access to a memory bank through the several ports preventing such monopolization.

Figures 2, 2A:
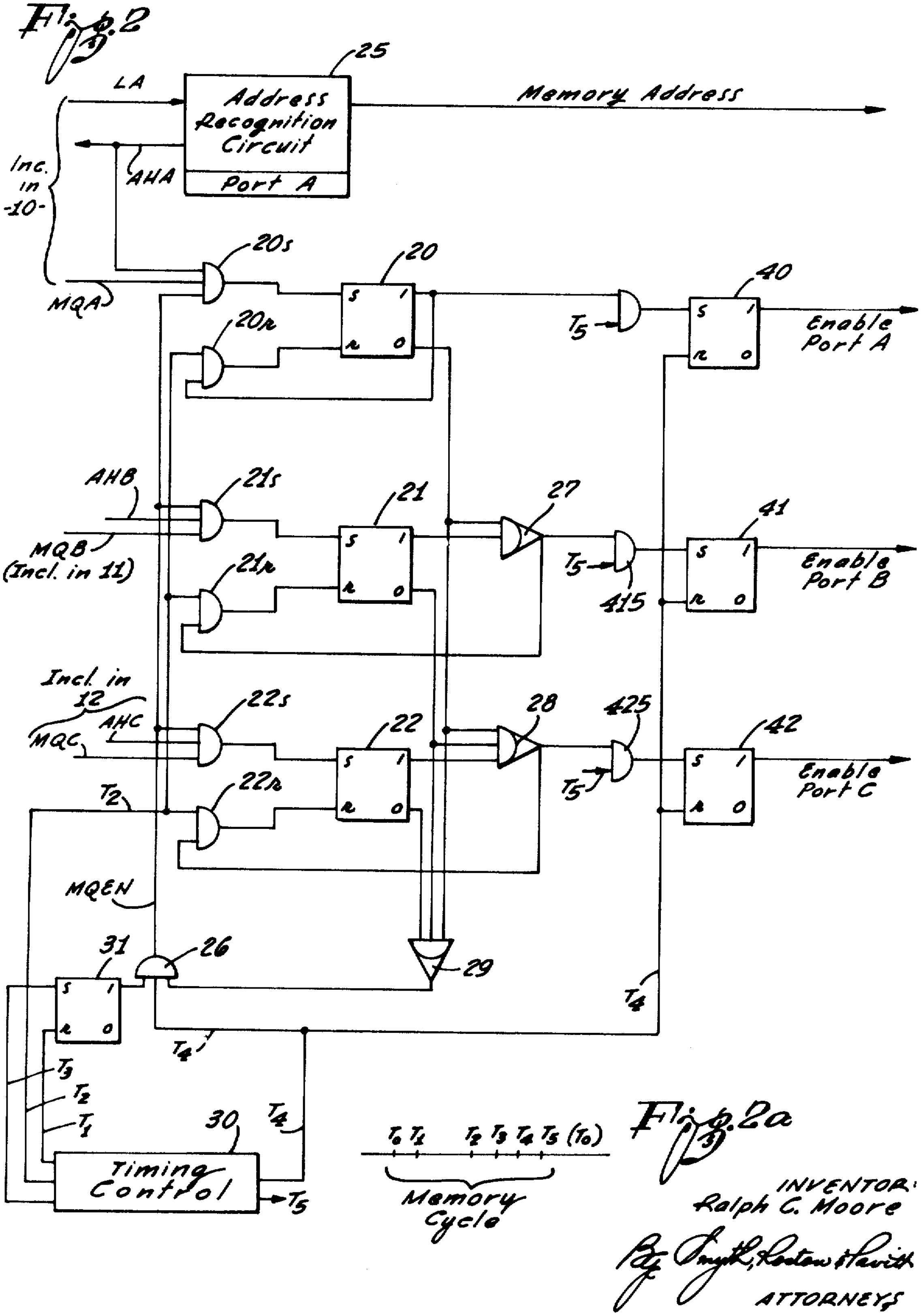
FIG. 2 illustrates a block and circuit diagram or a memory port control system showing the salient elements for practicing the invention.

Before proceeding to the detailed description of features of the invention as illustrated in FIG. 2, the signal lines included in these cables, such as 10, 11 and 12, will be outlined briefly. Each of these cables includes a plurality of addressing lines L on which the respective processor places addressing signals (see, for example, lines LA of cable 10 leading to port A). There and elsewhere letters A, B, and C are appended to designate association with ports A, B and C. These addressing signals are applied to all of the memory banks through the particular ports connecting the several banks to the particular cable.

Next, each of these cables 10, 11 and 12 includes lines for the transfer of data proper, i.e., data are placed on these lines by the memory after reading them from the memory location as defined directly or indirectly by the addressing signal on the addressing lines as mentioned. Alternatively the processor provides data on these data lines for storage in the memory bank in the location defined directly or indirectly by the addressing signals on lines L.

In addition, each of these cables includes control lines which essentially handle the dialogue between a processor and a memory bank, as the processors and the memory banks operate asynchronously to each other. This dialogue synchronizes the providing and accepting of data by the processors to the cyclically operating memory, particularly the timing and phases of the memory cycles.

Figure 1A:
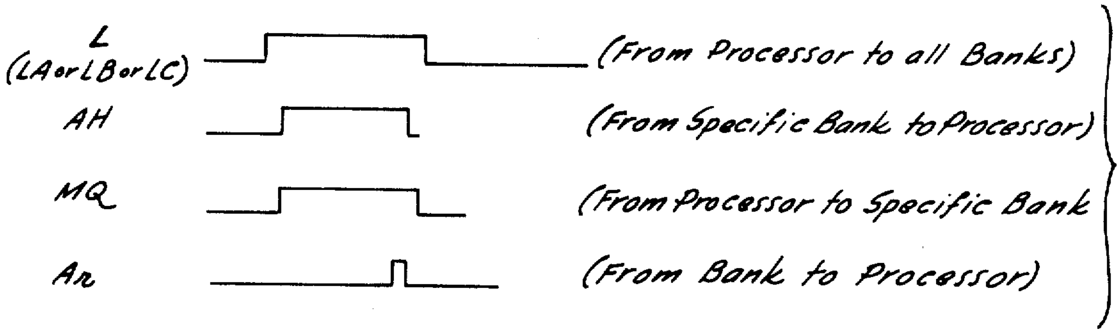

FIG. 1*a* shows the timing of some of the relevant signals establishing the dialogue. Complete details of this communication and dialogue is not of concern for the present invention and should be mentioned here only as far as necessary for an understanding of the basic operation. A processor requesting communication with memory raises addressing signals on its addressing lines L. These addressing signals are applied to all memory banks and particularly to all these ports along the cable which includes the addressing lines. Independently from memory operation, each port includes a device such as recognition circuit 25 in FIG. 2, which serves as a permanent "memory" for the particular addresses of memory locations implemented in the particular bank. This address "memory" of a port operates entirely independently from any data communication involved at the time, for example, through other ports of that memory. The port of the particular bank which holds that particular memory location and address will provide an "Address Here" signal, or AH for short; a port A will produce an "Address Here" signal AHA; port B, AHB, etc.

The processor having issued addressing signals and upon receiving an AH signal through one of the control lines included in the respective cable (10, 11 or 12), provides a memory request signal MQ through another control line, also included in such cable. The SIOP, for example, issues a request signal MQA in the appropriate signal lines leading to all ports A of the several banks to be received by the particular one which issued on "Address Here" signal. Concurrently thereto the particular processor either places data signals on the particular data lines included in the respective cable, or the processor prepares, for example, a register for reception of data from memory.

The processor is required to hold the request signal MQ as well as the data or the data receiving element in readiness until the memory bank, the port of which issued the "Address Here" signal AH, has honored that request. A bank honors a request by causing the address signals applied to that port transferred to the accessing system, thereby establishing, in fact, communication with the processor.

After a memory has accepted such a request, and after the necessary memory read and write cycle has been initiated, i.e., after the memory bank has begun to establish communication with the particular processor through the respective port, an "Address Release" signal is provided by the port, and it is a systems requirement that thereupon the processor drops the request signal MQ and removes the address signals from the addressing lines L included in the cable. This, in turn, releases the "Address Here" signal AH.

The particular port control system, illustrated in FIG. 2 more specifically shows how a port system constructed in accordance with the invention, handles overlapping or concurrent memory requests. The circuit illustrated in FIG. 2 handles this traffic of requests in a port system for a particular memory bank.

In FIG. 2 there are illustrated three buffered latches 20, 21 and 22, respectively associated with the ports A, B and C and for receiving requests arriving at these ports. Pertinent elements for control of the request latch 20 of the port A are illustrated in FIG. 2 in greater detail. Port A includes, as was generally mentioned above, the address recognition circuit 25 to which are coupled the addressing lines LA. Lines LA are part of the cable system 10 leading from the processor SIOP to all banks. The device 25 may include also an address transformation circuit which is of no interest (see application Ser. No. 678,235, supra). In any event, the recognition circuit 25 provides a signal AHA through a line of like designation as a return response to an address code on lines LA, if the address is implemented in the memory bank of which that particular port A is a part.

As was mentioned above, a signal AHA is, in effect, the first response in the operation involving the particular port A as to a communication demand or request made by the SIOP upon raising addressing signals on lines LA. The signal AHA serves as a gating signal for an AND gate 20S which is connected to the set input side of buffered latch 20. The second input for the gate 20 is a line receiving the signals MQA which is the memory request signal issued by the SIOP and initiated, as was mentioned above, when the SIOP receives the "Address Here" signal AHA. A third input signal for the gate 20S is called MQEN and is generated by a gate 26 and in a manner described more fully below.

Buffered latches 21 and 22 respectively receiver memory request signals for ports B and C whereby particularly the set input control gate 21S for the buffered latch 21 receives a memory request signal MQB issued by the input-output processor MIOP when receiving an "Address Here" signal AHB, issued by the port B when the bank associated with the port holds the address location defined by address signals set by MIOP into the addressing lines of cable 11. In FIG. 2 the signal lines AB and MQB are illustrated merely as inputs for gate 21S of latch 21, and it is presumed that port B has an address recognition circuit which is an exact duplicate of the address recognition circuit 25 for port A, as they are both associated with the same bank and, therefore, will respond to the same addressing signals, Gate 21S, of course, receives also the enabling signal MQEN.

Finally, the set side input of buffered latch 22 is controlled by a gate 22S, receiving the "Address Here" signal AHC issued by an analogous address recognition circuit associated with port C and responding to addressing signals issued by the CPU into the addressing lines of cable system 12. Also, the CPU issues a signal MQC for passage through a line of like designation as part of cable 12 and upon receiving the signal AHC generated by port C. Signals AHC and MQC, and also MQEN are enabling signals for the gate 22S.

It follows, therefore, that the buffered latches 20, 21 and 22 can be set in response to memory request signals MQA. MQB and MQC respectively, provided the memory bank holds the locations defined by addressing signals placed by the several processors on the several address lines of the respective cable systems. The setting of the buffered latches is timed by the signals MQEN, which are produced cyclically, as will be described shortly. Setting of these latches constitutes acceptance of the respective requests.

Each of the latches 20, 21 and 22 is reset through signals provided by gates 20R, 21R and 22R, respectively. These reset gates are enabled if the respective buffered latch is in the set state, if a buffered latch pertaining to a port of higher priority is not set. Accordingly, gate 20R is simply enabled by the set state signal of latch 20 itself.

A buffered AND gate 27 monitors whether buffered latch 21 is set and that latch 20 pertaining to the higher priority port A is not set. The output of gate 27 enables the reset gate 21R for buffered latch 21. The buffered AND gate 28 monitors that buffered latch 22 is set but responds only if the two latches 20 and 21 associated with ports of higher priority than port C, namely, ports A and B, are in the reset state. Buffered gate 28, if responding, enables the reset control gate 22R for the buffered latch 22.

Each one of these reset control gates 20R, 21R and 22R receives a timing signal from a timing control device 30. Timing control 30 is a periodically operating timing unit controlling duration and sequencing of phases within each full memory cycle for the memory bank associated with this port control system. The timing signals issued by the control device 30, therefore, bear a fixed relationship to the memory cycles within the bank.

For purposes of explaining the invention, details of the timing and phasing operation are not critical, and the following remarks suffice to explain the necessary time and phase relationship. TO is presumed to define the beginning of a memory cycle. A signal T1 is developed by unit 30 shortly thereafter. Signal T2 occurs at about the middle of a memory cycle. Its timing is critical only with regard to the timing of the address release signal provided by the memory to the processor which is in communication with the memory during the particular memory cycle. Signal T3 is produced shortly after time T2. Signal T4 is developed before the end of a memory cycle, and signal T5 is produced shortly thereafter, for example, at the end of the memory cycle.

The timing signal T2 issued by control device 30 time controls resetting of the particular buffered latch having its respective reset input control gates enabled, which is the case only when a higher priority latch is not set. Timing signal T2 issues when the memory cycle has progressed to the point that the memory control unit has issued an address release signal to the processor whose request is being honored by the current memory cycle, and which is associated with the latch. In other words, a latch 20, (or 21 or 22), for example, will be reset during a memory cycle if that memory cycle serves to establish data transfer through port A (or B, or C) between memory and SIOP (or MIOP, or CPU). That processor whose request is thus accepted in that manner received an "Address Release" signal and it is a condition that the processor upon receiving that address release signal through the respective cable has to drop its request signal MQ. It follows, therefore, that a buffered latch can be reset only if its respective set input gate, such as 20S, 21S or 22S is not enabled any more by an MQ signal. Thus signal T2 occurs after it is expected the particular processor has dropped its MQ signal in response to an address release signal.

A buffered AND gate 29 monitors reset state of each and all three buffered latches and provides a true output in response thereto, to enable MQEN generating gate 26. A second input for that gate is the set state output signal for a control flip-flop 31. Gate 26, when enabled by these signals, produces the MQEN signal, in response to the timing signal T4, which occurs toward the end of a memory cycle. The flip-flop 31 is set by the timing signal T3 and flip-flop 31 is reset at the beginning of the respective next memory cycle, for example, by timing signal T1.

The set side output of buffered latch 20 controls a buffered latch 40 which provides an enabling signal for enabling port A. Latch 40 can be set if latch 20 is in the set state, and by operation of timing signal T5 succeeding a timing signal T4 in response to which signal latch 20 was set. Details of enabling control, as provided by the flip-flop 40, do not require consideration. Briefly, the flip-flop 40, when set, provides enabling control for port A, associating the next memory cycle with the processor connected thereto, for example, SIOP. This means, in particular, that in response to the set state of flip-flop 40 the addressing signals on lines LA (or a transformation thereof) are gated to the memory addressing system proper and data transfer as between SIOP and the addressed memory location will take place through the port A and via the data lines of cable 10.

Analogously, flip-flop or latch 41, when set, enables port B for the same purpose. Its set input is controlled from the gate 27, i.e., the enabling flip-flop 41 for port B is set only when the buffered latch 21 is set and buffered latch 20 is reset by the time of a timing signal T5. Finally, there is a latch or flip-flop 42 for enabling port C, and the latch is set by the output of buffered gate 28 upon coincidence of the condition that buffered latch 22 is set and latches 20 and 21 are both reset. The circuitry for setting latches 40, 41 and 42 establishes port priority in that latch 41 can be set only at a time T5 if latch 40 is not being set at that time, while latch 42 can be set only when neither latch 40 nor latch 41 is set at a time T5.

The flip-flops 40, 41 or 42 are respectively reset by a timing signal T3 (or one could use T4) occurring during the second half of a memory cycle. At this time operating connection between memory and processor through the respective port can be broken as the memory either operates in the write-restore cycle portion of the memory cycle and the processor must have accepted the data provided by memory after the preceding read portion of that memory cycle, or the memory operates in the write cycle portion, holding internally the data previously provided by the processor for storage in memory. Communication between memory and processor is not required any more for either operation during the memory write or write-restore cycle portion.

The system as described operates as follows: Addressing signals are provided and received. "Address Here" signals (AHA, AHB, etc.) are produced and memory request signals MQ are issued in response thereto and received by the port system asynchronously to any memory cycle and any memory operation then in progress. These signals, such as AHA, AHB and AHC and MQA, MQB and MQC can be, and are, produced also asynchronously to each other. This includes the possibility that a processor which, for example, has just furnished data for storage, raises new address signals on the line L (LA, LB, etc., as the case may be), right after the previous ones have been removed. The thus newly initiated dialogue results immediately in an "Address Here" signal (possibly coming from the same bank with which the processor presently still communicates), and a request signal MQ follows. This request signal, however, is not accepted until the port control system establishes a request accepting phase point defined by a signal MQEN.

During a memory cycle, at a time T2, it may occur that thereafter all latches 20–21–22 are in the reset state, so that the output of the buffered AND gate 29 turns true, providing a first enabling signal. At time T3, thereafter, flip-flop 31 is set to prepare gate 26, and the timing signal T4 shortly following thereafter passes as MQEN signal through gate 26 as enabling signal to all set control gates 20S, 21S and 22S for the latches 20, 21 and 22, respectively.

At that instant (T4), none, some, or all of the latches 20, 21, 22 may be set, which is basically unpredictable because of the asynchronous operation of CPU, MIOP and SIOP in respect to each other, and because of the subdivision of the memory in banks which are individually controlled as to access. It follows, therefore, and allowing for settling time of the various gates and latches, that shortly after the time T4 (producing MQEN), latches 20 and/or 21 and/or 22 may set. If at least one of the latches is set, the output of gate 29 turns false, and the request acceptance phase is terminated therewith. Assuming that latch 20 was set at that time, gates 27 and 28 are blocked and provide disabling signals to the gates 41S and 42S. At time T5, shortly thereafter, flip-flop 40 is set to enable port A in the next memory cycle. It may be assumed that at the time T4, latches 21 and 22 were also set, but gates 27 and 28 still provide disabling input signals to gates 41S and 42S.

The memory cycle, beginning at or shortly after time T5 provides service for honoring the request for communication made by the SIOP and couples the memory bank to the SIOP. At the beginning of this memory cycle, time T1, flip-flop 31 is turned off. The address signals are gated from line LA through port A into the memory bank access system, directly or after a transformation, and the specific location is now accessed. After the access control system has begun to operate, the memory bank or port A issues a control signal, mentioned above, and called address release signal, in response to which SIOP must remove MQA as well as the address signals defining the memory location involved in the current memory cycle from the particular lines in cable 10. As the addressing signals drop from lines LA, "Address Here" signal AHA is likewise dropped by recognition circuit 25. Therefore, gate 20S does not receive any of the input signals AHA, MQA and T4. The timing is chosen such that the removal of these signals can be expected by the time T2 which occurs well within the memory cycle.

The reset gate 20R is enabled as long as latch 20 is in the set state. Hence, latch 20 is turned off at time T2, and for the time being cannot be turned on again. In particular, the request acceptance latch 20 for SIOP request will not be turned on by the next timing pulse T4 through gate 26 because it was assumed that latches 21 and 22 have been set previously, so that the resetting of flip-flop 20 does not turn gate 29 to the true state.

Resetting of latch 20 at the time T2, however, enables gate 27 and, therefore, gate 41S. The next time signal T5 toward the end of the particular memory cycle involving current data transfer through port A, the port B Enable flip-flop 41 is, therefore, set and the next memory cycle will involve data transfer between MIOP and memory bank through port B.

At time T2 during this memory cycle for data transfer between MIOP and memory bank, latch 21 will be reset as its reset input gate 21R was enabled when the output of gate 27 turned true. Therefore, at time T2 of this second memory cycle, the output of gate 28 turns true, and at time T5, toward the end of that memory cycle involving data transfer through port B, the port C Enable flip-flop 43 is set. This third memory cycle, therefore, will involve data transfer as between the CPU and the memory bank.

In the meantime, i.e., during any of those three memory cycles, memory request may have already been received again for ports A, B and/or C, i.e., signals AHA, AHB, AHC, as well as MQA, MQB and MQC may have been raised shortly after data transfer between the ports A and/or B have been completed. Also, shortly after T2 in the third memory cycle the CPU may have made another request. However, the gate 26 providing the MQEN enabling signal will not respond until toward the end of third memory cycle involving the transfer of data through the port C. Thus, even though port A has higher priority and even though port A may have received another request prior to beginning of data transfer through any of the lower priority ports, such request for communication between port A will not be accepted until the data transferred through port C is completed.

In particular, at the time T2 within the memory cycle involving data transfer through port C, latch 22 is reset through the gate 22R so that thereafter gate 29 can turn true. At T3 control flip-flop 31 is set, and toward the end of that memory cycle, at time T4, MQEN is produced again to gate the memory request pending at that time into the memory request acceptance system. It can readily be seen that the request acceptance signal MQEN (defining a request acceptance phase point) is produced three memory cycles after the previous one because at the previous request acceptance phase point all three request accepting latches 20, 21 and 22 were set. If only two latches are set, only two memory cycles elapse before the respective next MQEN signal; if only one request is pending at the time of a MQEN signal, only one memory cycle elapses before the next one is produced. It follows, therefore, that the duration of a memory request acceptance cycle depends on the number of request pending at the beginning of that cycle.

Another request for communication through port C may have issued before a timing signal T4 producing MQEN, even though the current memory cycle involves transfer through port C for the following reason. Prior to T2 and within that memory cycle, the previous request and address signals have been removed from the address control lines in cable 12, but subsequent to T2 and prior to T4, the fast operating CPU may have already made another request for memory communication, even though it is still involved in the current memory cycle. However, now the priority comes into play. As new requests are gated into the system by the gate 26 at T4 during the memory cycle involving the lowest priority port, a pending request of that port is accepted.

However, higher priority memory ports which have also received requests and which are accepted at the time (T4-MQEN) when requests are again accepted, will be serviced first, and the sequence of servicing is now determined by port priority. The low priority port C may have to wait for four memory cycles at the most, but possibly less, before a request can be honored, if a request is received in port C right after a memory request acceptance phase point (T4-MQEN). A four memory cycle waiting period results from the following consideration. Requests for communication through ports A and B may have been pending at that phase point which establishes two cycles for waiting before the low priority request is accepted. After the next memory request acceptance phase point, these ports may have requests pending again, and port C may have to wait additionally for these two memory cycles before receiving service. Thus, the CPU may, at times, have a waiting period for four memory cycles (at the most) between request and service.

Generally, such long waiting period for the CPU can be avoided by having, for example, sequential program addresses implemented in different banks, by having operand locations implemented in banks different from the locations for the instructions, and by having operands requiring two (or more) locations stored in different banks. Programming in this manner reduces the probability that the CPU makes two requests to the same bank in immediate sequence so that the effective waiting period to be expected is reduced. However, an important systems modification should be noted here.

The CPU is the processor most frequently requesting access, but it cannot monopolize a bank any longer, regardless how fast it issues requests and regardless to which port the CPU is connected. Thus, the CPU may well be connected to the highest priority port A. One can see that with this system, communication of a processor through the highest priority port may still involve two memory cycles as a waiting period in between, no more, but possibly less, if at a memory request acceptance time not all ports receive requests. Hence, even under rare "worst case" conditions, a communication request made to the highest priority port will never be pending longer than for two memory cycles.

On the other hand, it is positively ensured that port C will be able to provide communication between the processor connected to it and the memory bank with no more than four memory cycles waiting period between two communication steps. It is, therefore, impossible for any of the higher priority ports to monopolize the particular bank. Furthermore, it has been found that the rule that the highest priority port may still have to wait for, at the most, two memory cycles, is no restraint on the speed of any peripheral equipment communicating through that highest priority port with memory.

It is important, however, that the system is devised such that the highest priority port can normally expect rather immediate response to its requests because the repetition rate of memory acceptance phase points is not a fixed one. Two memory cycles waiting period is a maximum duration and on the average, the waiting period will be less. If, for example, the CPU operates without the particular memory bank, the repetition rate for acceptance phase points may be shortened to two memory cycles, and if the MIOP is serviced by another memory bank, the memory request acceptance phase point may even reoccur directly at memory cycle rate. It is this variation in cycle rate for the memory request acceptance phase point, which speeds up the system considerably, still satisfying the priority requirements for the various participants in the system.

The systems illustrated can be modified in various ways. For example, rather than employing gates 27 and 28, one can employ three flip-flops 20 in parallel and two flip-flops 21, also operating in parallel as far as input signals are concerned; only one each respectively controlling the inputs for flip-flops 40, 41 and 42 respectively. The others are used to provide hold down signals directly to the output of latches of lower priority.

Another modification involves utilization of the inverted MQ signals to enable the reset gates 20R, 21R and 22R. This is a tool with which the respective processor can override the request acceptance cycling as described. If, for example, MQA stays true, SIOP is permanently coupled to the bank via port A, and the other processors cannot gain access to the bank. However, this possibility may never be used and it may be desirable to guard against an accidental lockout of the other processors.

Another modification involves provision for more than one request acceptance cycle. A low priority, buffered processor may be bypassed for several request acceptance cycles as between higher priority ports alone, and one or several low priority ports are only occasionally included in the request acceptance operation pursuant to an enlarged cycle. Another modification is to operate the request accepting latches 20, 21, etc., independently from each other and to utilize, in fact, operating (fast relative to a memory cycle) ring counter the stages of which being associated with the latches, and their set state (one stage at a time) functions as request acceptance enabling of the particular latch. The ring counter shifts from stage to stage rapidly until finding a memory request pending, whereupon it sets the latch and shifting stops. When the requests has been honored, rapid shifting of the counter continues until another pending memory request signal is found, whereupon the respective accepting latch is set, etc.

The invention is not limited to the embodiments described above, but all changes and modifications thereof not constituting departures from the spirit and scope of the invention are intended to be included.

I claim:

1. Apparatus for handling multiple memory requests for access to a memory bank, the request originating in a plurality of different processors and at random times in relation to each other, the requests identifying the need for data communication between the respective processor and the memory bank, each request signal accompanied by addressing signals, the processor including at least one central processing unit and one input/output processor requesting memory access independently from each other, comprising:

- timing means providing timing signals on a cyclically repetitive basis and in synchronism with memory access cycles;
- first means including a plurality of storage devices respectively associated with the processors of the plurality and connected for receiving memory request signals and storing same;
- gating means connected to the timing means and operatively connected to pass the request signals respectively to the storage devices of the first means, concurrently and in synchronism with a timing signal representative of an instant close to the end of a memory cycle;
- first circuit means connected for enabling the gating means when none of the plurality of storage devices has no longer stored a request signal;
- second circuit means connected for processing the memory access requests as identified by request signals stored in the storage device of the plurality in predetermined priority, one memory cycle per request, and including circuit means connected to the storage devices to erase a stored request signal identifying a request that is processed in a memory cycle, during that memory cycle, prior to the particular instant within that cycle; and
- third circuit means connected additionally to the gating means for rendering storage of a request dependent upon the presence of the particular memory location in the bank as identified by the addressing signals and to which access is requested by the respective request signal.

2. In a data-processing system, having a plurality of memory banks and a plurality of processors, and a connecting busses between each bank and each of the processor, for passing data between each processor and any of the banks and for providing access request and addressing signals from each of the processors to all of the banks, each memory bank having a port through which pass data, addressing signals and access request signals, the improvement comprising:

first means providing signals in response to an addressing signal when received from any of the processors representing whether or not the location having the address is in the memory bank having the port;

second means individually connected to the processors of the plurality for individually receiving access request signals as issued by the processors in random time relation;

third means connected to the first and second means for storing the request signals individually only when the first means provides a signal in representation of presence of the location in the bank as identified by the addressing signals accompanying a request signal to be stored;

fourth means connected to process the stored request signals in a predetermined order of priority including means to erase storage of a request signal when the access request identified by that signal is services; and fifth means operating the third means in timed response when all stored request signals have been erased for obtaining storage of new request signals.